June 4, 1946.　　　W. P. MASON　　　2,401,361
MEANS FOR PROTECTING SHIPS FROM SUBMARINE EXPLOSIONS
Filed Oct. 4, 1940　　　2 Sheets-Sheet 1
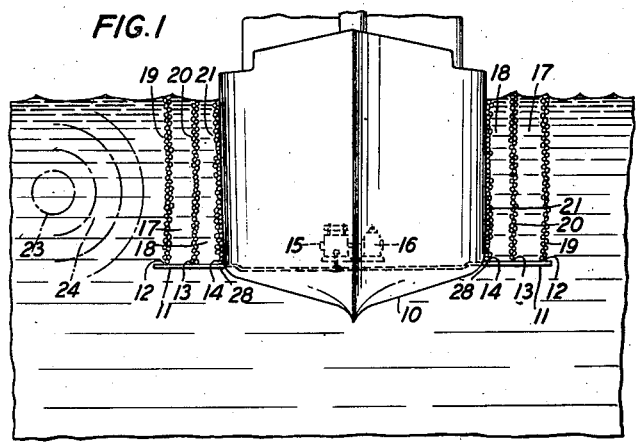
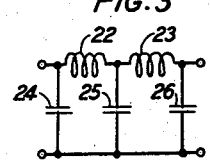
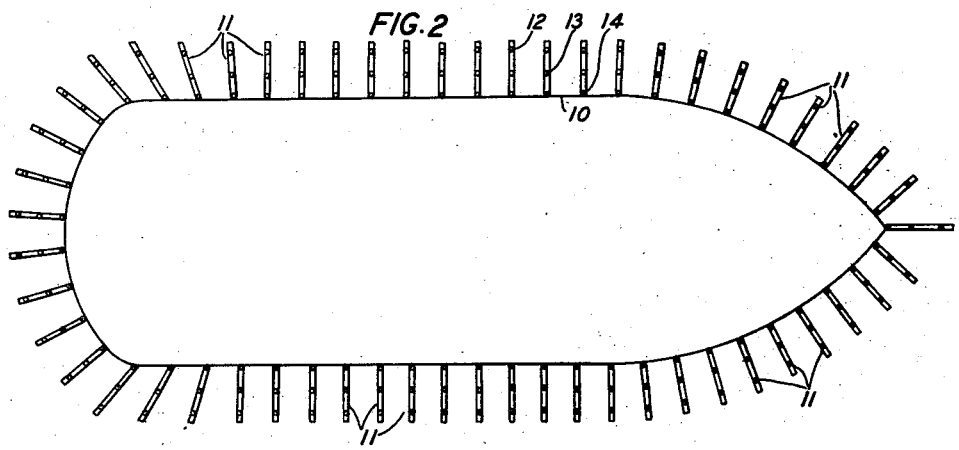
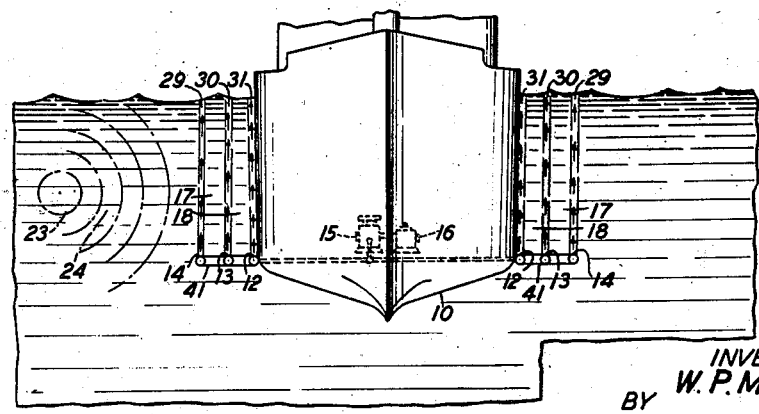
INVENTOR
W. P. MASON
BY Franklin Mohr
ATTORNEY June 4, 1946.  W. P. MASON  2,401,361
MEANS FOR PROTECTING SHIPS FROM SUBMARINE EXPLOSIONS
Filed Oct. 4, 1940  2 Sheets-Sheet 2

INVENTOR
W. P. MASON
BY
Franklin Mohr
ATTORNEY

Patented June 4, 1946

2,401,361

UNITED STATES PATENT OFFICE 2,401,361

MEANS FOR PROTECTING SHIPS FROM SUBMARINE EXPLOSIONS

Warren P. Mason, West Orange, N. J., assignor to Bell Telephone Laboratories, Incorporated, New York, N. Y.

Application October 4, 1940, Serial No. 359,640

8 Claims. (Cl. 114—240)

This invention relates to submerged structures, as for example ships, either surface or submersible, and more particularly to the protection of such structures or vessels from injury below the water line. It is especially adapted to guarding against damaging effects of pressure waves or explosion waves in the water such as may originate from exploding mines, bombs, or the like, close to the structure. On like principle but probably to a lesser extent, the invention serves to give protection from projectiles such as torpedoes and shells or from bombs when any of these explode directly against the structure below the water line.

When a battleship is bombed by an airplane, one of the principal hazards is from bombs which drop in the neighborhood of from ten to fifty feet from the sides of the ship and explode in the water. It is known that such an explosion will give rise to a pressure wave in the water that will, upon striking the hull, exert momentary pressure which in many cases is sufficient to break open the hull and cause the ship to be disabled or to sink. Thus it is not necessary that a projectile actually pierce, or even strike, the hull to cause serious damage. Explosions in the surrounding water, caused by hostile attack or by mines or the like, as in war time, are particularly dangerous to passenger or merchant vessels as these in general are not as heavily armored as are warships. The invention is not limited, however, to the protection of unarmored or lightly armored vessels, but is also applicable to armor-clad ships or other submerged structures of all sorts, as additional protection.

In accordance with one embodiment of the invention, a large number of pipes are extended sidewise from the ship near the bottom and from the pipes are ejected air bubbles from a high pressure source such as an air compressor or tank. The pressure used may be 100 pounds per square inch, or other suitable amount. The bubbles rise to the surface in several more or less continuous sheets or layers with clear water in between the layers. For an explosion taking place outside the alternate layers of low density water containing bubbles and of ordinary density water, these layers constitute a low-pass mechanical or acoustical filter. The compressibility of the layers containing the bubbles is quite high, giving a high value of compliance and a low value of cut-off frequency for the filter structure. The result is that when the explosion waves reach the first bubble layer a good share of the energy is reflected, due to the low impedance of the filter compared with that of the water. An action of this type is readily observable at the air surface above an underwater explosion, the effect of the explosion being to raise the level of the surrounding water for a short time while the wave is being reflected. The surface is not broken till the expanding gas envelope reaches the surface, and by that time the pressure has reached such a low value that it is not dangerous. This phenomenon suggests that if the ship were to be surrounded with a layer of air, the effect of an underwater bomb explosion would be nil. A practical approach to this solution is to employ a layer of air bubbles. By using several such layers an additional advantage is gained in that energy not reflected by the first layer will be attenuated in large part by the filtering action of the alternate layers of air bubbles and clear water.

The amount of machinery required to maintain the air pressure is not large, and weight for weight it provides an efficient way of giving bomb protection. When the ship is under way and an attack is not expected, the pipes at the side may be raised on hinges or otherwise to the sides of the ship to cut down wave resistance.

For an explosion occurring directly against the side of the ship, the layer of bubbles is still of use for it cuts down the amount of water that the explosion has to push against and also provides an easy path for the escape of the high pressure gases. As a result the pressure wave against the ship's side is considerably reduced in intensity.

Broadly considered, it is contemplated that the water immediately surrounding a hull of a ship or any other submerged structure is to be separated and maintained by artificial means into a number of layers of relatively different density. Layers of undisturbed water are to be made to alternate with layers of greatly reduced density produced by bubbles or streams of compressed air. The air may be introduced into the water through any suitable system of pipes or sprays mounted on the sides or bottom of the hull and connected with air compressors or the like inside the vessel. The air pressure may be maintained in known manner by power from the ship's engines or any suitable auxiliary source. The alternate layers of water of different effective densities are maintained substantially parallel to the hull and act as a shield or as a mechanical or acoustical filter. A pressure wave reaching the outermost layer of reduced density discharges a portion of its energy by elastically increasing the pressure of the air in this layer and the effect of the wave upon the next layer of undisturbed water is greatly reduced over what it would be had the wave not first traversed the low density area. The same process of attenuation or cushioning is repeated in each succeeding low density layer. Moreover, the wave in the low density layer encounters inertia in propagating itself into the following normal density layer.

The low density layer may be viewed as yielding or complying to the pressure transmitted by the wave and thus harmlessly storing and reflecting energy that would otherwise be transmitted through the water to the hull. The high density layer may be viewed as retarding the wave and reflecting it back toward its source. The effect of the alternate layers of high and low density is analogous to the effect of a low-pass filter in an electrical wave system, which acts to prevent a sudden impulse or shock applied at its input terminals from being transmitted to the output terminals without profound modification. In the case of the electric waves the electrical pressure transmitted is attenuated by the filter.

The pressure wave may be in the form of a compressional wave in the water or in a body of submerged gas, the latter expanding from the region where the explosion has occurred. Usually the two forms will be concomitant. In any case, the alternate layers of high and low density fluid are effective in attenuating the pressure transmitted by the wave.

The invention is more particularly described below with reference to the drawings, in which:

Fig. 1 is an elevation of a vessel protected by apparatus embodying the invention;

Fig. 2 is a plan view of the same;

Fig. 3 is a schematic diagram of an electrical wave filter having certain properties analogous to those found in the apparatus embodying the invention;

Fig. 4 is an elevation, partly in cross-section, showing an alternative arrangement of protective apparatus according to the invention;

Figure 5:
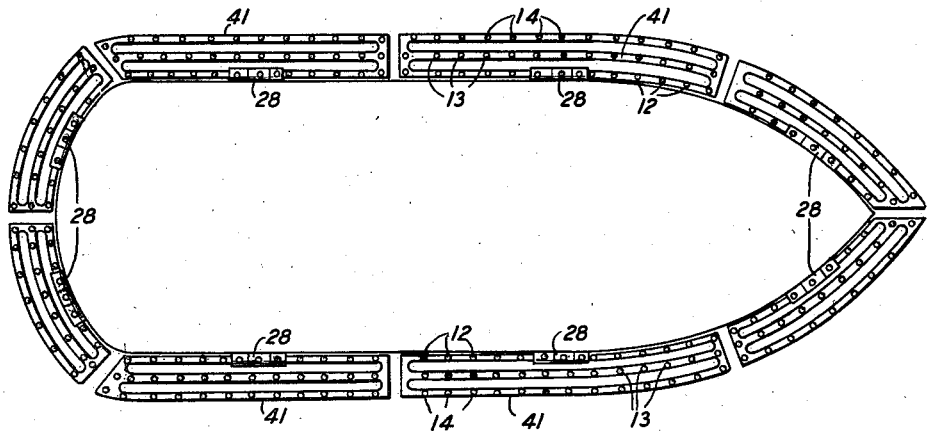
Fig. 5 is a plan view of the arrangement shown in Fig. 4.

Referring to Fig. 1, the outline of the hull of a surface ship is represented at 10. Extending laterally from either side of the hull, preferably near the bottom, is a series of pipes 11, each provided with orifices, or nozzles, 12, 13 and 14, preferably directed upward. For clarity in the drawings only two of the pipes are shown in this figure. The pipes 11 communicate through the hull in any convenient manner and are connected to the outlet of an air compressor or pump 15, driven by the ship's engine or some suitable auxiliary power source 16. Hinges may be provided as at 28 for folding the pipes to reduce water resistance when the protective system is not in use. The orifices or nozzles 12, 13, 14 are suitably spaced apart so that when compressed air is discharged therefrom the water surrounding the hull 10 is divided into roughly comparable layers of relatively undisturbed water 17, 18, and layers permeated with air bubbles or an air stream, 19, 20, 21.

A center of explosion is indicated at 32, accompanied by an expanding mass of gas 33 and compressional waves indicates as at 34, in the water.

As shown in Fig. 2, the pipes 11 are preferably spaced at intervals around both sides of the hull 10 to provide protection from all directions. All the pipes may be connected with the compressor 15 as indicated generally in Fig. 1. When the pipes 11 are closely spaced and are discharging simultaneously the effect is to form layers of ordinary density water alternating with layers of reduced density comprising water mixed with air bubbles or air streams.

The compressional waves in the water, upon reaching the outer air bubble layer 19, expend or store much of their energy in elastically compressing the air, leaving only a small portion of energy to be effective in transmitting the wave into the water layer 17. Upon reaching the air in layer 20, the wave again expends or stores energy in compressing the air. The process continues, with attenuation of the pressure wave at each stage, until the wave reaches the hull 10 with only a small fraction of its energy remaining. By this process of attenuation, the wave may be rendered harmless before it strikes the hull 10.

The expanding gas, upon reaching the air layer 19 secures an outlet for more rapid expansion into the air bubbles and upward toward the surface. Only a portion of the gas continues on into the water layer 17 and this portion encounters inertial impedance in penetrating the water. Upon reaching the next air layer 20 the gas secures another outlet for rapid expansion and escape to the surface. By repetition of this process the effect of the expanding gas upon the hull 10 is attenuated and may be made harmless.

It will be evident that the amount of attenuation of the impulse of the explosion may be increased to any desired degree by using a sufficient number of air layers alternating with water layers. It will be noted that the attenuation increases substantially as a geometric progression as the number of layers is increased, which means that relatively few layers should be required for reducing an impulse to a harmless amplitude.

In the electrical analogy, Fig. 3, the series inductances 22, 23, correspond to the water layers 17, 18, and the shunt capacitances 24, 25, 26 to the air layers 19, 20, 21. The series inductances are inertia members which store energy in a magnetic field when an electromotive force sends current through them. An impulsive electromotive force is ineffective to build up the current except at a slow rate dependent upon the inductance value. The shunt capacitances are electrically elastic members which store energy in an electric field. An impulsive electromotive force finds a low impedance in the shunt path and sends a large current through it, thereby diverting current from the output terminals of the filter. The effect of the filter upon a sudden impulse is that of a delayed transmission of an impulse reduced in amplitude.

In the fluid system, the water layers are the inertial members and the air layers are the elastic members, the former being effectively series connected and the latter effectively shunt connected.

An advantage of the system of the invention that will immediately be evident is that it can be operated while the vessel is in a danger zone and may be stopped when not needed, thereby saving power.

Provision such as hinges 28 may be made in known manner so that the pipes 11 may be folded or swung against the sides of the vessel when not in use, in order to reduce the resistance to motion of the vessel.

The weight and cost of the pipes, compressors and power plant required to practice the invention will be offset in many cases by the reduction in rigid armament that its use makes possible.

Fig. 4 shows in elevation and partial cross-section an alternative arrangement of piping 41 lengthwise of the ship, which may be preferable in some cases.

Fig. 4 also illustrates the use of higher gas pressure or air pressure resulting in columns 29, 30 and 31 of air flow substantially unbroken into bubbles as has been indicated in the case of Fig. 1. The direction of the air flow is shown by arrows.

Figure 6:
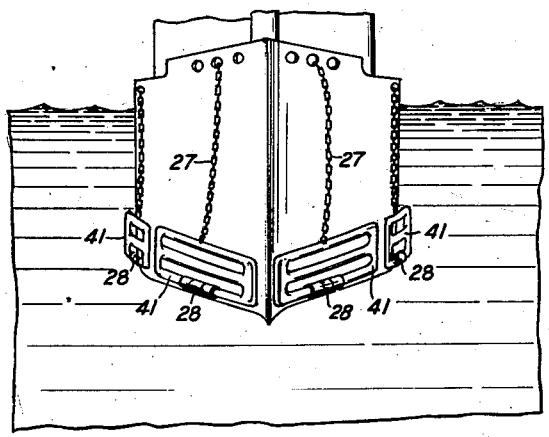
Fig. 6 is an elevation of a vessel having a protective system with means for raising the system to reduce wave resistance when the system is not in use.

Figs. 5 and 6 show in plan and elevation, respectively, a modification of the system of Fig. 4, in which longitudinal piping 41 is arranged to conform approximately to the shape of the side of the vessel and is hinged as at 28. When not in use the pipe assembly may be raised by means such as a chain 27 to a position in which the water resistance is reduced to a minimum. When in use for protection of the ship, the apparatus is lowered to a position similar to that shown in Fig. 4.

Figure 7:
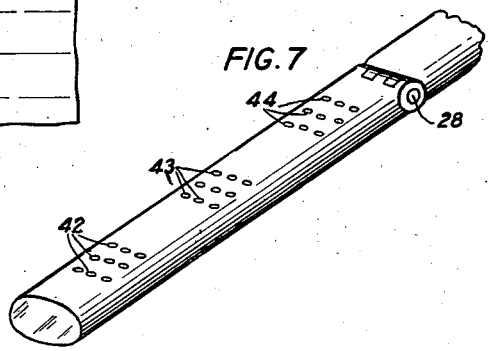
Fig. 7 is a perspective view of a detail of another form of protective apparatus.

Fig. 7 shows in perspective view a modified transverse pipe of the same general form as represented in Figs. 1 and 2 but having a broad, flat upper surface and orifices or nozzles arranged in groups 42, 43 and 44. By means of this construction thicker layers of air bubbles are provided, with greater cushioning effect. In addition, the spacing between the orifice groups is increased in proportion, giving thicker layers of undisturbed water. In general, an improvement in protective value is possible by thus proportioning the layers, whereby the mechanical filter acquires a lower value of cut-off frequency and consequently requires a longer time to transmit a pressure wave. The net result is greater attenuation of the pressure transmitted through the system and greater protection to the ship.

In all of the applications of the invention, the approximation to an air envelope surrounding the hull may be increased by arranging to have the inner air layer 21 or 31 adhere as closely as possible to the hull. This result may be obtained by proper positioning of the piping and orifices.

While certain specific arrangements of apparatus are illustrated for carrying out the invention as applied to a surface ship, the application of the same principles in the case of a submarine vessel or a submerged immobile structure will be readily appreciated and also it will be evident that other forms and arrangements may be used that will be within the scope of the appended claims.

What is claimed is:

1. Apparatus for protecting the hull of a ship from pressure impulses, comprising a plurality of nozzles for compressed gases arranged in a plurality of spaced rows on the same side of the ship, substantially parallel to the sides of the hull and below the area to be protected, and means for discharging compressed gases into the water from said orifices, said rows of nozzles being spaced apart sufficiently to permit the formation of a distinct layer of low density gas-permeated fluid above each of said rows of nozzles with a layer of normal density water between each pair of low density layers, said layers of both kinds being substantially parallel to the hull.

2. In combination, the submerged hull of a vessel, alternate distinct layers of high and low density fluid surrounding said hull including at least two low density layers, and means for maintaining said layers at unequal densities.

3. In combination, a submerged surface to be protected from the effects of explosion waves in the surrounding fluid, alternating layers of normal density fluid and relatively low density fluid adjacent to and substantially covering said surface, at least two of said layers being of the relatively low density fluid, and means for reducing the effective density of the requisite portions of the fluid to form said low density layers.

4. Protective apparatus for a ship comprising a plurality of pipes extending from the hull below the water line and provided with orifices arranged in a plurality of rows on either side of the ship substantially parallel to the sides of the hull, and means for supplying compressed gas to said pipes to maintain a discharge of gas from said orifices, said rows being so spaced as to leave a substantial layer of relatively undisturbed water between the gas discharges from adjacent rows.

5. In combination, a ship's hull, a plurality of nozzles arranged in a plurality of rows on either side of the ship substantially parallel to said hull and below the water line, and means for discharging compressed air through said nozzles, the respective rows being spaced apart sufficiently to leave a substantial layer of relatively undisturbed water between the compressed air permeated regions produced by these discharges.

6. A shield against explosion waves in a fluid medium, comprising at least three sheets of the unmodified medium alternating with sheets of the medium modified as to density by admixture of a fluid of materially lower density, and means for maintaining said sheets at materially unequal average densities.

7. Protective apparatus in accordance with claim 4 in combination with means to raise the pipes to a position in which their interference with motion of the ship is reduced when the protective apparatus is not in use and to lower the pipes to operative position when desired.

8. Protective apparatus in accordance with claim 4 in which the pipes are hinged and means are provided to raise and lower the pipes.

WARREN P. MASON.